(12) United States Patent
Kawai et al.

(10) Patent No.: US 6,360,030 B1
(45) Date of Patent: *Mar. 19, 2002

(54) ILLUMINATION DEVICE AND IMAGE READING APPARATUS USING THE SAME

(75) Inventors: Tatsundo Kawai, Hadano; Masami Tabata, Isehara, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,359

(22) Filed: Dec. 12, 1997

(30) Foreign Application Priority Data

Dec. 27, 1996 (JP) .............................. 8-350129

(51) Int. Cl.[7] .............................. G06L 7/00; H04N 1/04
(52) U.S. Cl. ....................................... 382/312; 358/484
(58) Field of Search ........................... 359/28, 34, 591, 359/599, 615; 358/474, 475, 478, 479, 480, 484; 348/195, 197, 296, 294; 382/312

(56) References Cited

U.S. PATENT DOCUMENTS

| | | | | |
|---|---|---|---|---|
| 5,373,364 A | * | 12/1994 | Krzyminski | 356/405 |
| 5,379,757 A | * | 1/1995 | Hiyama | 348/76 |
| 5,905,583 A | * | 5/1999 | Kawai | 358/484 |
| 6,123,431 A | * | 9/2000 | Teragaki et al. | 362/31 |
| 6,273,577 B1 | * | 8/2001 | Goto | 362/31 |

FOREIGN PATENT DOCUMENTS

| | | | | |
|---|---|---|---|---|
| JP | 7-332952 | * | 7/1995 | G01M/11/02 |
| JP | 11-84137 | * | 3/1999 | H04N/1/04 |
| JP | 2000-164017 A | * | 6/2000 | G02B/6/00 |

* cited by examiner

*Primary Examiner*—Jerome Grant, II
(74) *Attorney, Agent, or Firm*—Robin, Blecker & Daley

(57) ABSTRACT

The form of a light condensing part of an illuminating device is of a freer form such as expressed by a general polynomial, rather than a round cross-sectional form. Accordingly, an illumination device or an image reading apparatus having the same which includes a light guide element having an entrance surface provided at one end thereof for an incident light flux, an exit surface provided on a side other than the one end extending in a longitudinal direction of the light guide element for allowing the incident light flux to exit therefrom, a reflecting and/or scattering area provided at a side other than the exit surface for reflecting and/or scattering the light flux propagated in a light-transmissive member, and a light condensing part provided on the exit surface for condensing the exiting light flux, and a light source provided adjacent to the entrance surface of the light guide element, wherein, assuming that in a cross-section orthogonally intersecting the longitudinal direction, a direction opposite to a normal line of the reflecting and/or scattering area is a z axis and a direction orthogonally intersecting the z axis is a y axis, at least a part of a surface of the light condensing part is expressed by a polynomial of y, and at least one of coefficients of odd-number-th degree terms in the polynomial is not "0".

22 Claims, 21 Drawing Sheets

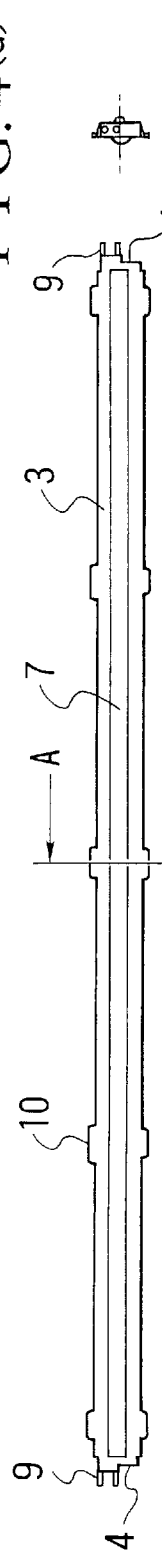
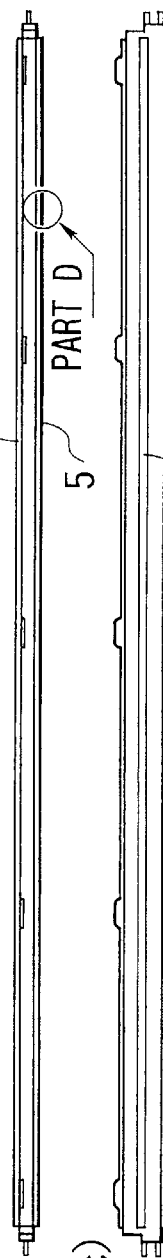
FIG. 4(a)
FIG. 4(b)
FIG. 4(c)
FIG. 4(d)
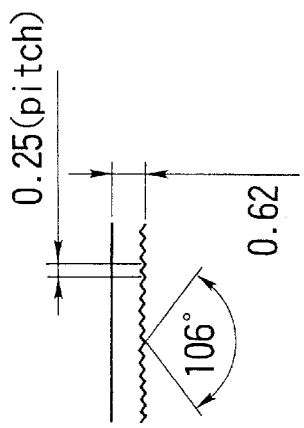
FIG. 4(h) ENLARGED PART D (10/1)
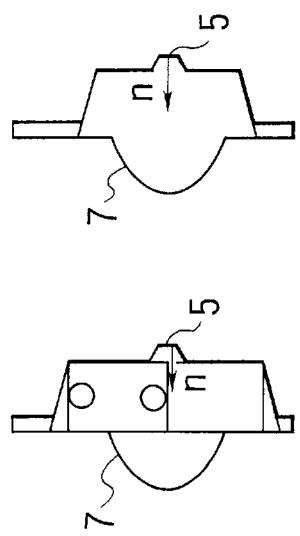
FIG. 4(f)  FIG. 4(g)
ENLARGED SIDE (5/1)   A-A SECTION (5/1)
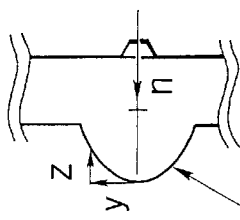
FIG. 4(e)
SURFACE OF LENS PART BEING DEFINED BY THE FOLLOWING EXPRESSION
$Z = 0.08*y^4 - 0.15*|y|^3 + 0.4*y^2 + 0.05*|y|$ FIG. 12(a) FIG. 12(b) FIG. 12(c) FIG. 12(d)
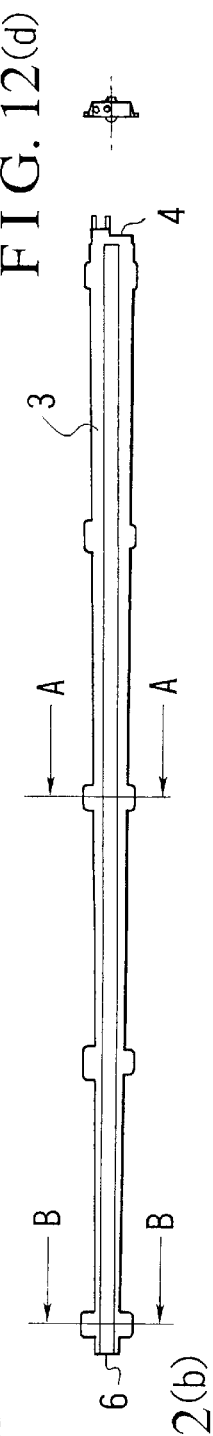
FIG. 12(e)
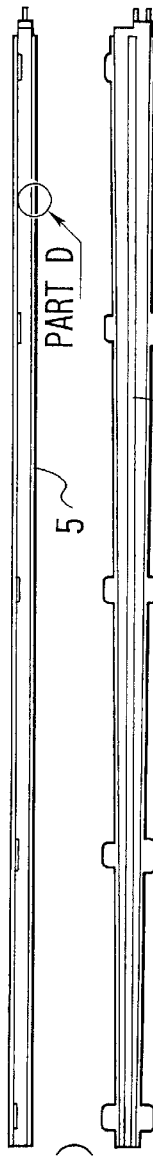
SURFACE OF LENS PART BEING DEFINED BY THE FOLLOWING EXPRESSION
$Z = 0.08*y^4 - 0.15*|y|^3 + 0.4*y^2 + 0.05*|y|$
FIG. 12(f) FIG. 12(g) FIG. 12(h) ENLARGED SIDE (5/1) A-A SECTION (5/1) B-B SECTION (5/1)
FIG. 12(i) ENLARGED PART D (10/1)
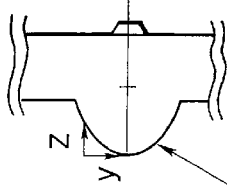

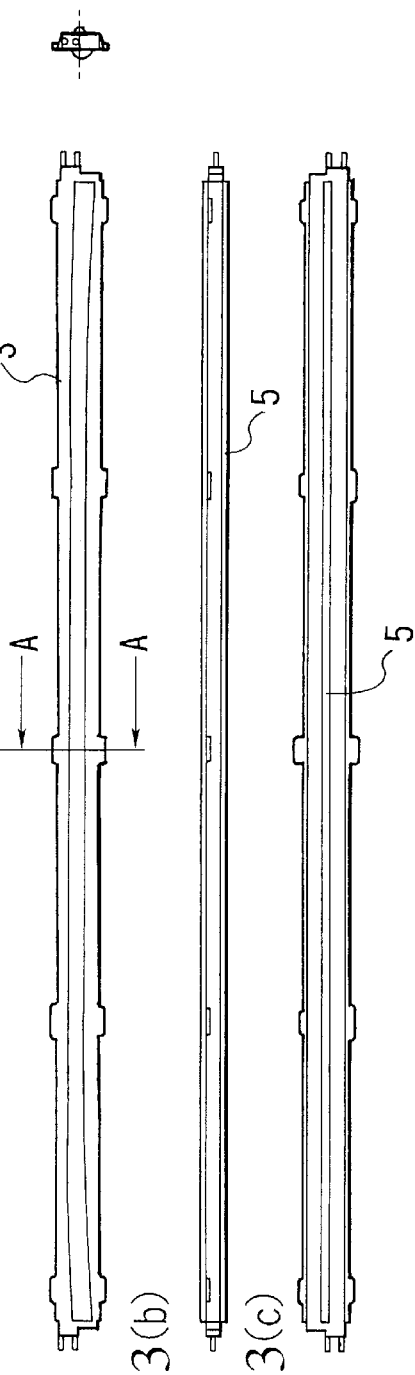
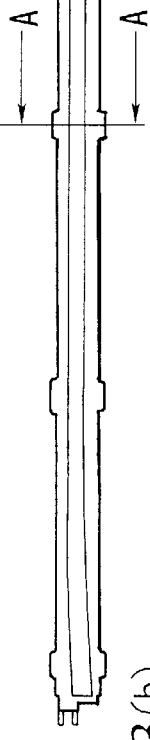
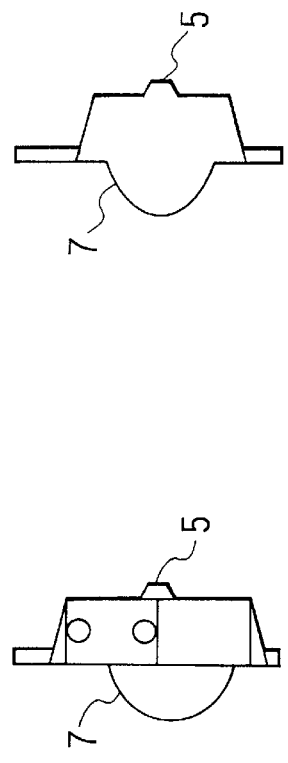

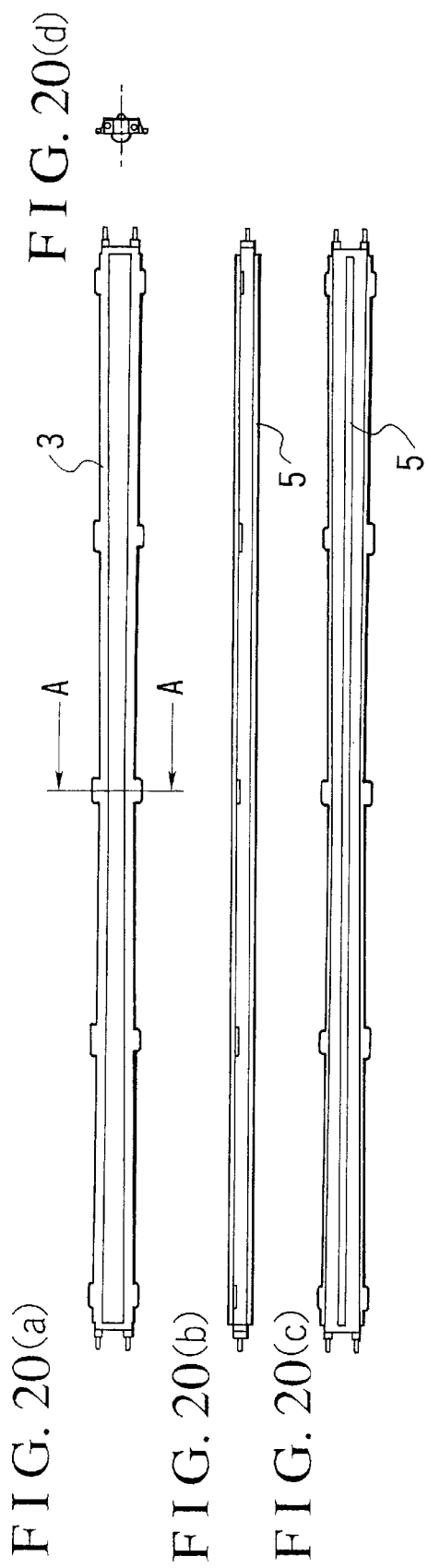

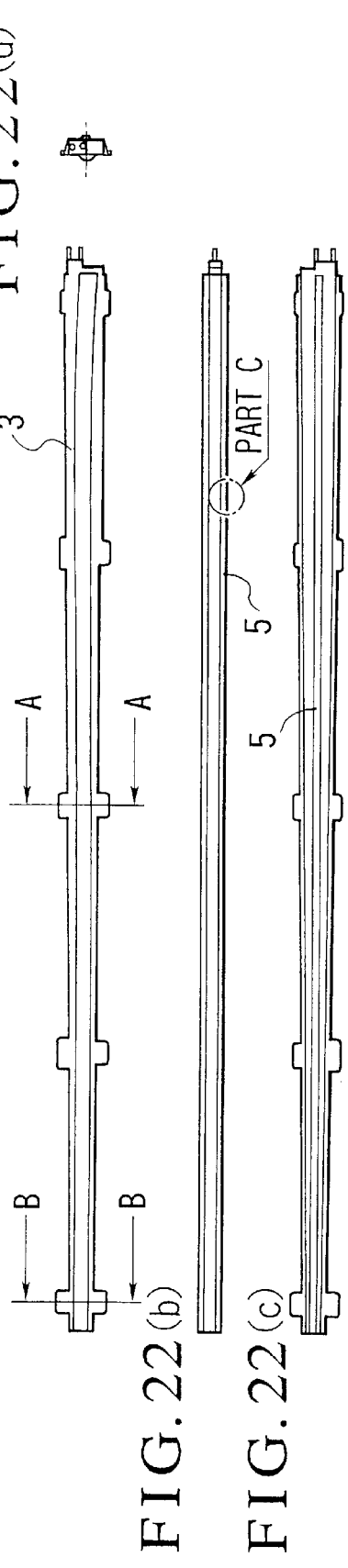
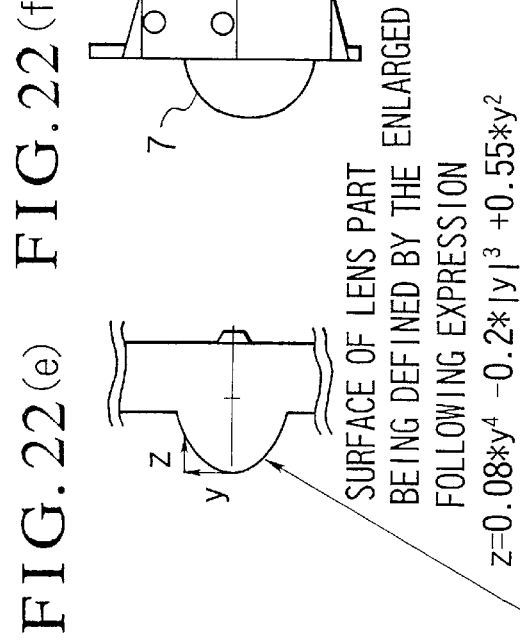
FIG.22(a) FIG.22(b) FIG.22(c) FIG.22(d)
FIG.22(e) FIG.22(f) FIG.22(g) FIG.22(h) FIG.22(i)
SURFACE OF LENS PART BEING DEFINED BY THE ENLARGED SIDE FOLLOWING EXPRESSION
$z = 0.08*y^4 - 0.2*|y|^3 + 0.55*y^2$

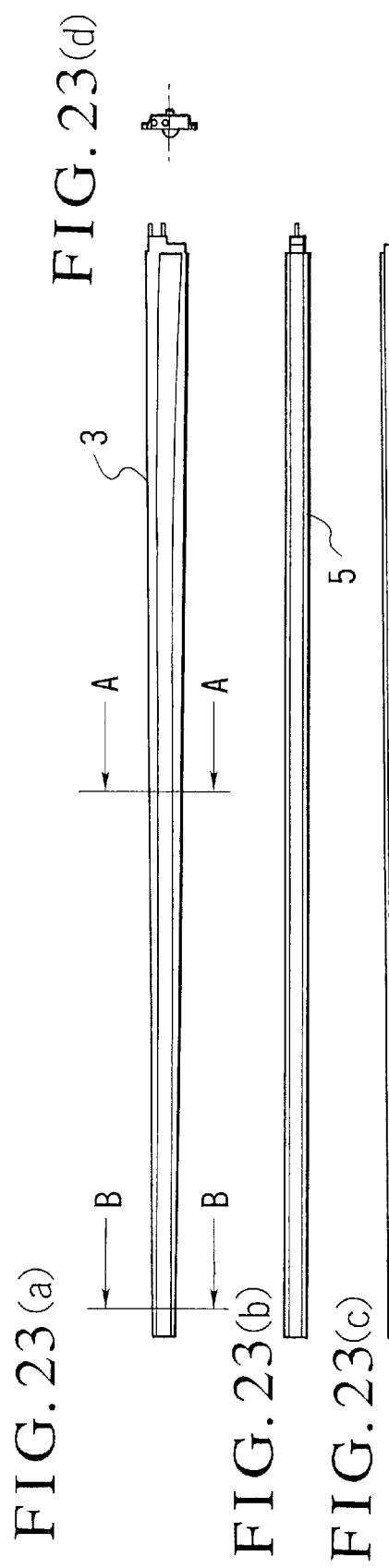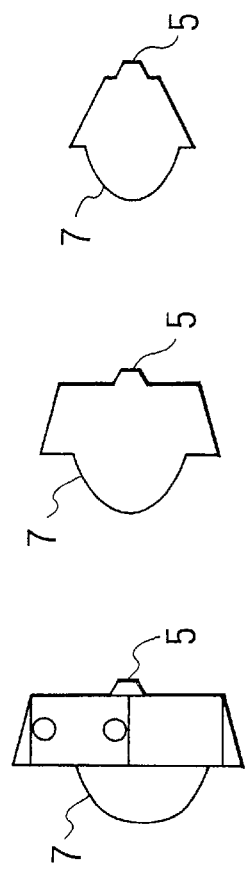

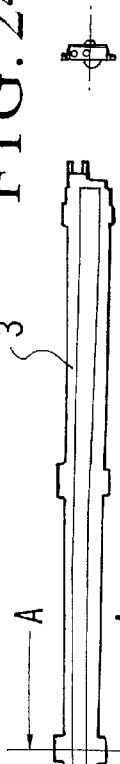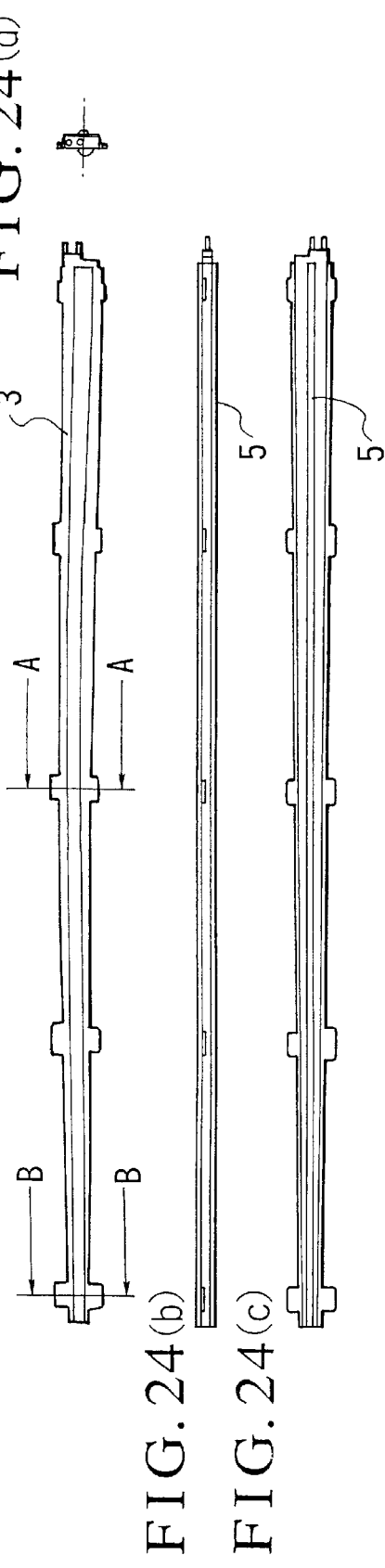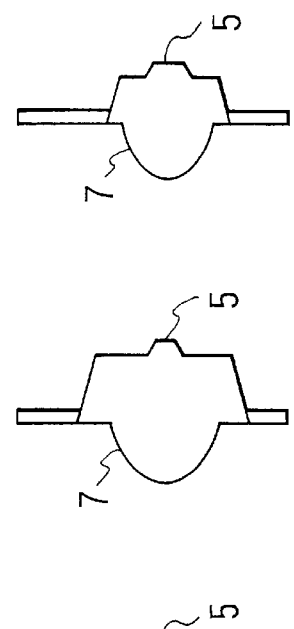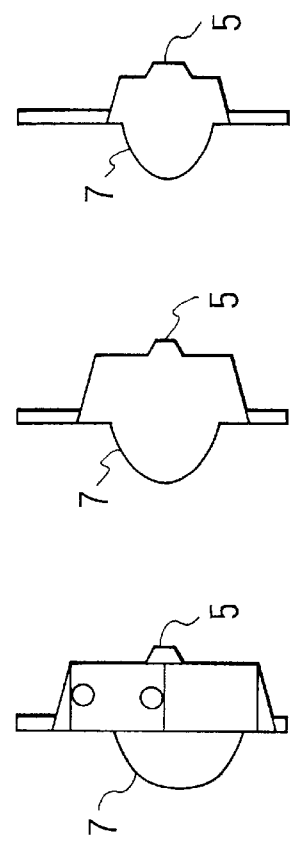
FIG.24(a) FIG.24(b) FIG.24(c) FIG.24(d) FIG.24(e) FIG.24(f) FIG.24(g)
ENLARGED SIDE (5/1)  A-A SECTION (5/1)  B-B SECTION (5/1)

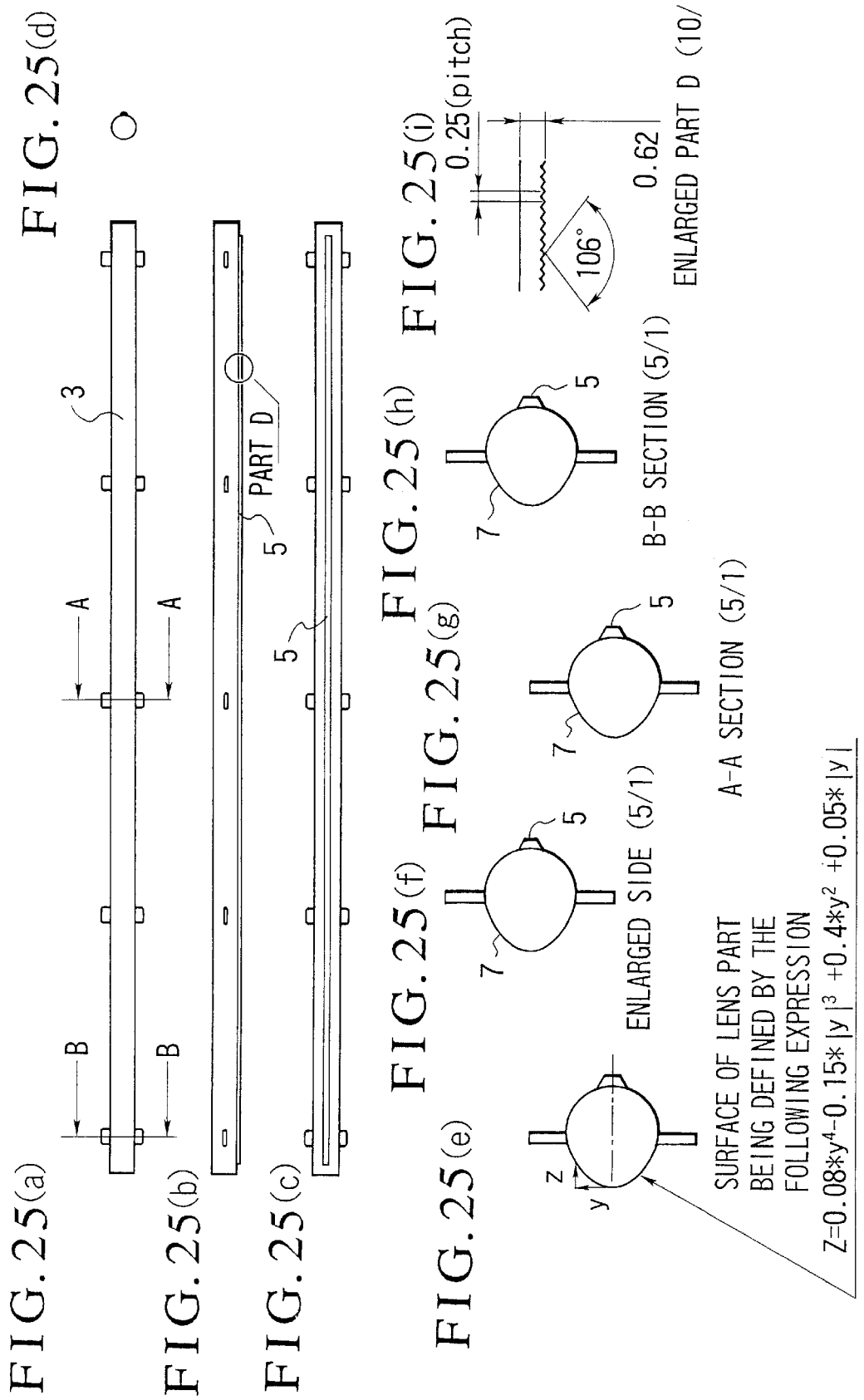

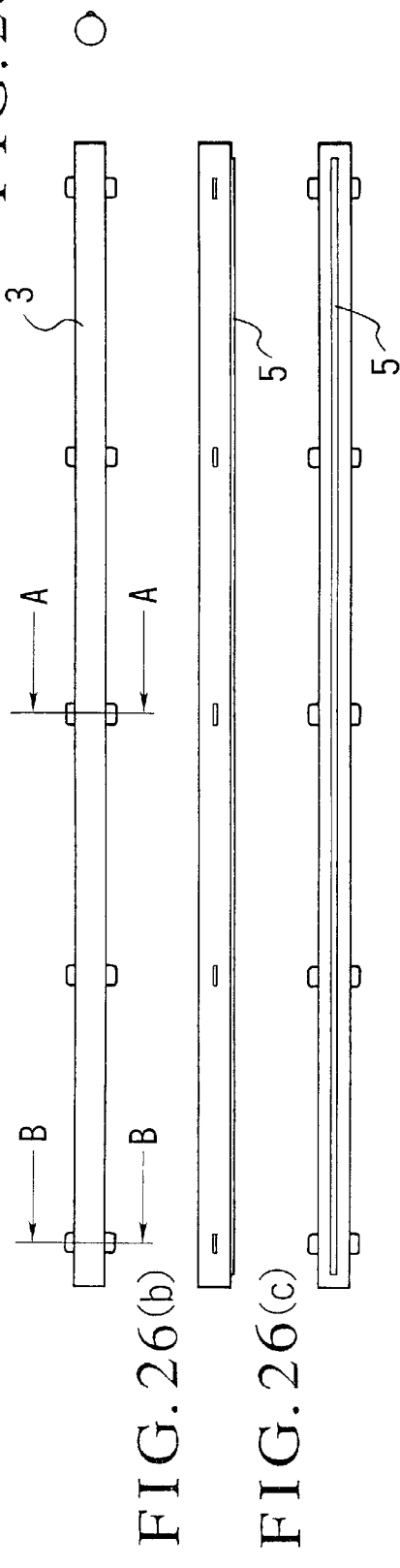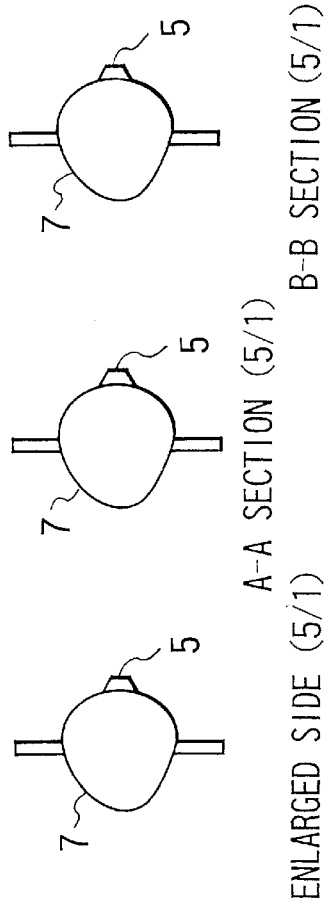

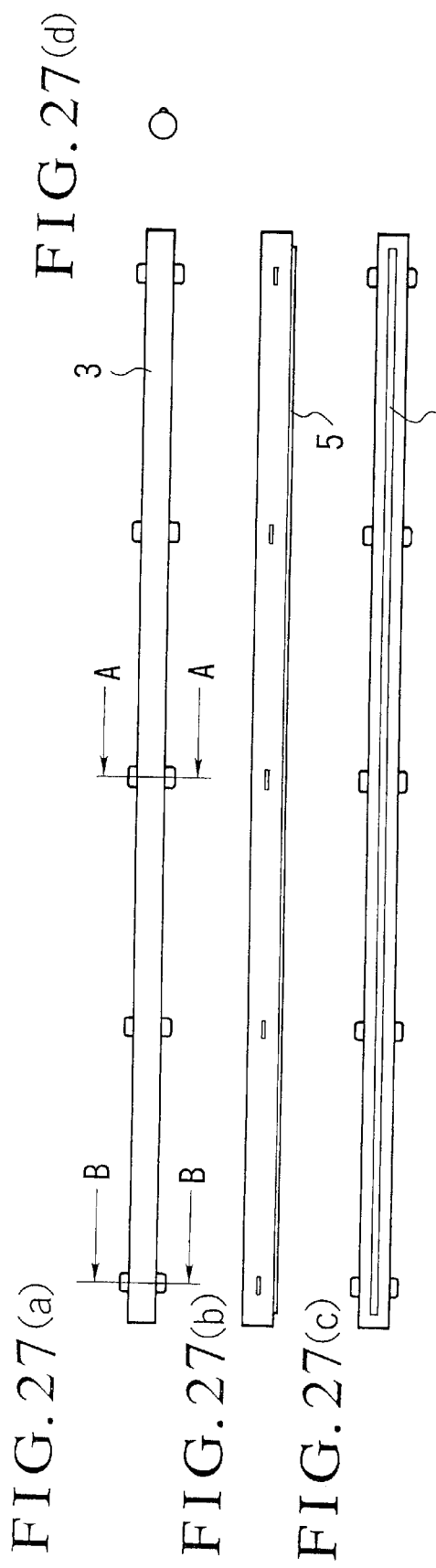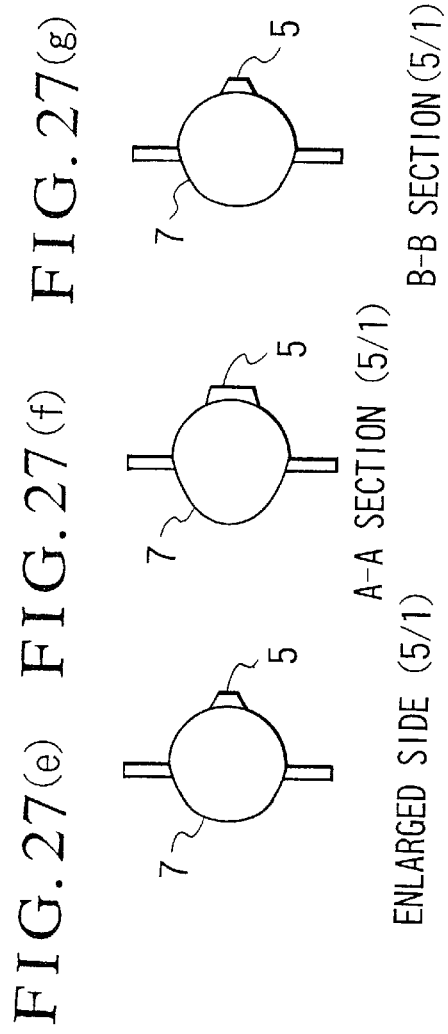

ILLUMINATION DEVICE AND IMAGE READING APPARATUS USING THE SAME

BACKGROUND OF THE INVENTION

1. Field of the Invention

The present invention relates to an illumination device having a light source and a light guide element for guiding a light flux emitted from the light source, and having particular characteristics in an exit surface of the light guide element, and to an image reading apparatus using the illumination device.

2. Description of Related Art

Known arrangements developed for the illumination device used for illuminating a read original in image reading apparatuses for information processing apparatuses such as facsimiles, photocopiers, and so forth include discharge tubes such as fluorescent lamps or LED arrays which are made up of an array of a great number of LED chips. Particularly, in recent years, increased use of the facsimile in the home has necessitated even more compact and inexpensive products, and thus there are a great many products which use LED arrays. Also, there are arrangements wherein LED chips are provided at the ends of a rod-shaped light-transmissive member made of transparent glass, resin, or the like, so that the light flux emitted from the LED chip is linearly extended by making use of the internal reflection of the light-transmissive member, and thus cast upon the original document to be read, in order to reduce the number of chips used and to realize even further reductions in cost.

FIG. 28 shows a cross-sectional diagram of such an image reading apparatus. In FIG. 28, reference character A denotes an original document which has an image to be read on the surface thereof. Reference character B denotes a light source for casting light upon the original document A. Reference character C denotes a rod lens array for imaging the light flux reflected from the surface of the original document A onto the surface of a sensor D. Reference character E denotes a housing for holding the light source B and the rod lens array C. Reference character F denotes a glass plate which holds the original document A, and reference character G denotes a substrate upon which the sensor D is mounted.

The light source B is composed of a light-transmissive member formed of a light-transmissive material such as that denoted by 3 in FIG. 28, and LED lamps (not shown) provided on either end thereof.

FIGS. 29(*a*) and 29(*b*) show schematic diagrams for explaining the function of the light source B shown in FIG. 28. FIG. 29(*a*) is a schematic diagram showing a cutaway view of the light source B from the direction indicated by the arrow in FIG. 28, wherein the portion of the original document A upon which light is cast serves as a plane to be illuminated.

In FIGS. 29(*a*) and 29(*b*), reference numeral 1 denotes LED lamps fabricated by mounting LED chips in a package formed of resin, ceramics, or the like. Reference numeral 3 denotes a light-transmissive member made of a light-transmissive material such as acrylic resin, for example, reference numeral 4 denotes an entrance surface by which the light flux generated by the LED lamp 1 enters the light-transmissive member 3, and reference numeral 5 denotes an area for reflecting and/or scattering the light flux propagated through the light-transmissive member 3 to project the light flux out of the light-transmissive member 3.

The light flux emitted from the LED lamp 1 and entering the light-transmissive member 3 from the entrance surface 4 of the light-transmissive member 3 is propagated throughout the light-transmissive member 3 by repeatedly reflecting at the inner surface thereof. In the course of such reflecting, the light flux is cast into the above area 5, wherein the light flux is diffused, and the light is cast out of an exit surface thereof facing the above area 5, thus illuminating the reading area of the original document in a linear manner. A light condensing part 7 is formed on the exit surface, thus illuminating the reading area of the original document with a degree of illuminance greater than an arrangement not provided with the light condensing part 7.

In the event that an LED lamp having only a single color light is used for the LED lamp 1, an apparatus for reading monochrome images can be formed, but in the event that reading of color images is to be performed, LED lamps having differing light colors such as red, blue, and green, for example, are provided to the same end together, or an LED lamp which is provided with LED chips of differing light colors within a single LED lamp, or an arrangement wherein LED chips of differing light colors are bonded to a substrate, is used. With these arrangements, the LED chips of the various colors are switched at high speed and caused to emit light, and storing and reading of signal charges in and from the sensor D are performed in synchronism with the above switching.

For example, of the LED chips 1 provided to the entrance surface 4 of the light-transmissive member 3, in the case of causing the red light emitting chip to emit light, the reading portion of the original document is illuminated with a red color. The light which is reflected off of the original document A at this time and is imaged by means of the focusing rod lens array C causes a charge to be stored in the sensor D, this signal serving as red information of the image on the original document. Illumination by LED chips for emitting green light and blue light generates blue information and green information, respectively.

In order to improve capabilities of such an image reading apparatus by raising the reading speed of the image or raising the S/N ratio during reading of the image, the illuminance of the portion of the original document being read must be raised as high as possible. Accordingly, the light flux exiting from the exit surface of the light-transmissive member is preferably emitted so as to be condensed on the portion of the original document to be read. With known arrangements, a light condensing part has been provided at to the exit surface of the light-transmissive member to yield this effect, but in almost all cases, the light condensing part has been of such a circular cross-sectional form. Also, many such light condensing parts have been formed to emit the light flux in a parallel manner, and the light condensing effects have not been sufficient. As shown in FIG. 30, the light condensing part 7 of the light-transmissive member 3 is round in sectional shape, so that the scattered and reflected light from the area 5 becomes a parallel light flux at the exit surface of the light condensing part 7.

However, in the event that sufficient convergence of light on the portion to be read is attempted with a round cross-sectional condensing part, there have been the following problems, i.e., the radius of curvature must be reduced, but doing so also reduces the size of the light condensing part, resulting in an increase in the amount of light flux leaking instead of being cast into the light condensing part, meaning that the resultant illuminance on the portion of the original document to be read is not increased. As shown in FIG. 31, if the exit surface of the light condensing part 7 is narrow, light flux leaks out in directions other than the direction toward the original document.

Also, the angle distribution of the light flux reflected at the reflecting and/or scattering area and heading toward the light condensing part differs between a portion of the light-transmissive member near the LED lamp serving as the light source and a portion of the light-transmissive member farther away from the LED lamp. This has been problematic in that in the event that the form of the light condensing part is uniform throughout, since the state of convergence on the original document differs between the portion near the LED lamp and the portion farther away from the LED lamp, this tends to result in non-uniform illuminance distribution on the original document.

BRIEF SUMMARY OF THE INVENTION

It is an object of the present invention to solve the above problems. More specifically, it is an object of the present invention to solve the problems by using a light condensing part for the illumination device having a freer form such as that expressed by a general polynomial, rather than a circular cross-section.

It is another object of the present invention to achieve even greater effects by making the light condensing part in such a form that, in the polynomial, such that the sign of a coefficient of the quadratic term and/or a coefficient of the quartic term is opposite to the sign of a coefficient of the cubic term.

It is another object of the present invention to obtain uniform illuminance distribution by changing the form of the light condensing part along the longitudinal direction of the light-transmissive member.

It is yet another object of the present invention to obtain an even higher degree of uniformity in illuminance distribution even in cases where the position of light convergence is shifted to the right or left instead of directly above the reflecting and/or scattering area, or where the plane to be illuminated is illuminated from an oblique direction instead of a vertical direction, by forming the light condensing part so as to be non-symmetrical.

It is a further object of the present invention to improve illuminance on the original document and obtain image signals with good resolution, by means of employing the above illumination device in the image reading apparatus.

Other objects and feature of the present invention will become apparent from the following detailed description of preferred embodiments thereof taken in conjunction with the accompanying drawings.

BRIEF DESCRIPTION OF THE SEVERAL VIEWS OF THE DRAWING

FIGS. 4(a) to 4(h) are diagrams illustrating in detail an optical member of the image reading apparatus according to the first embodiment.

FIGS. 12(a) to 12(i) are diagrams illustrating an optical member of the image reading apparatus according to a second embodiment of the present invention.

FIGS. 13(a) to 13(f) are diagrams illustrating the form of the light condensing part changing according to the position in the longitudinal direction of the light-transmissive member in the image reading apparatus according to a third embodiment of the present invention.

FIGS. 20(a) to 20(f) are diagrams illustrating an optical member of the image reading apparatus according to a fourth embodiment of the present invention.

FIGS. 22(a) to 22(i) are diagrams illustrating an optical member of the image reading apparatus according to a fifth embodiment of the present invention.

FIGS. 23(a) to 23(g) are diagrams illustrating an optical member of the image reading apparatus according to a sixth embodiment of the present invention.

FIGS. 24(a) to 24(g) are diagrams illustrating an optical member of the image reading apparatus according to a seventh embodiment of the present invention.

FIGS. 25(a) to 25(i) are diagrams illustrating an optical member of the image reading apparatus according to an eighth embodiment of the present invention.

FIGS. 26(a) to 26(g) are diagrams illustrating an optical member of the image reading apparatus according to a ninth embodiment of the present invention.

FIGS. 27(a) to 27(g) are diagrams illustrating an optical member of the image reading apparatus according to a tenth embodiment of the present invention.

DETAILED DESCRIPTION OF THE INVENTION

Hereinafter, preferred embodiments of the present invention will be described in detail with reference to the drawings.

[First Embodiment]

Figure 1A:
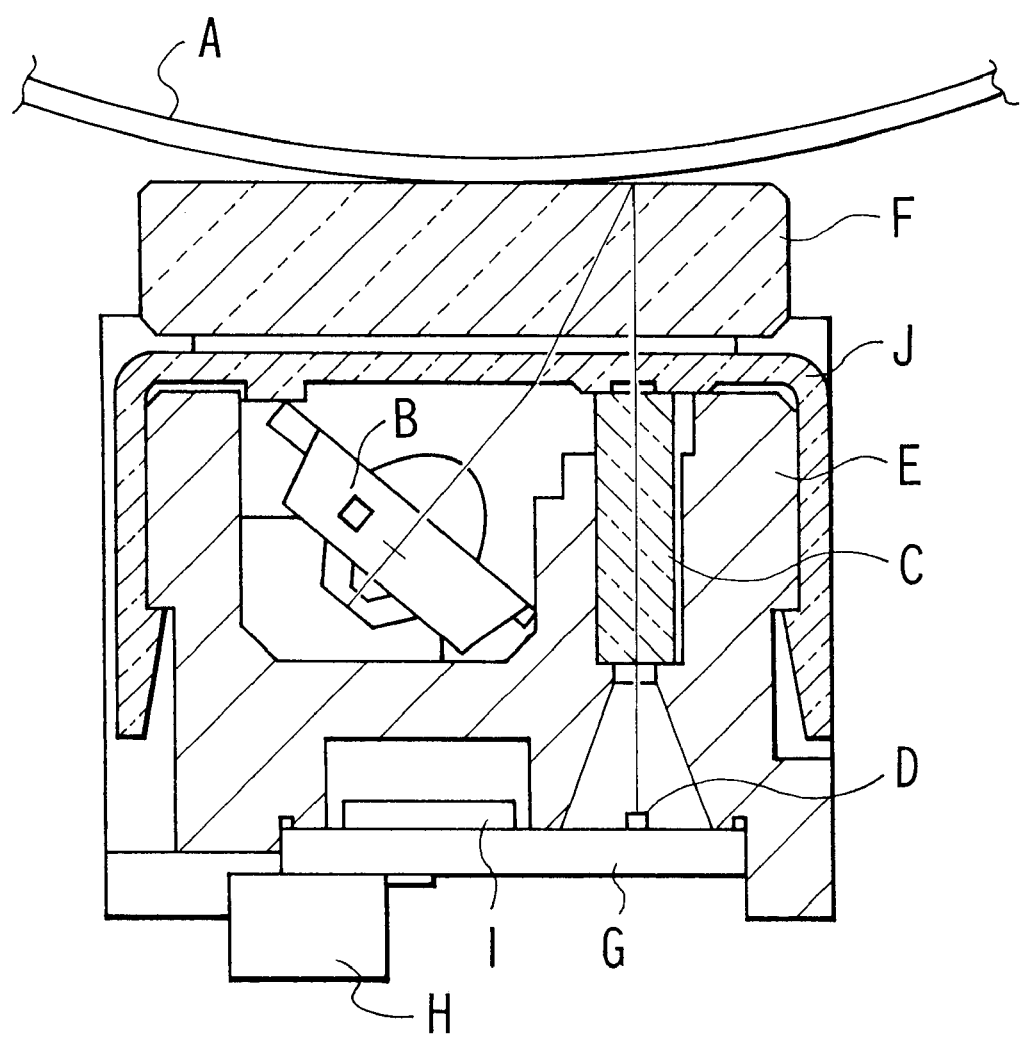
FIG. 1(a) is a cross-sectional view of an image reading apparatus according to a first embodiment of the present invention.
Figure 1B:
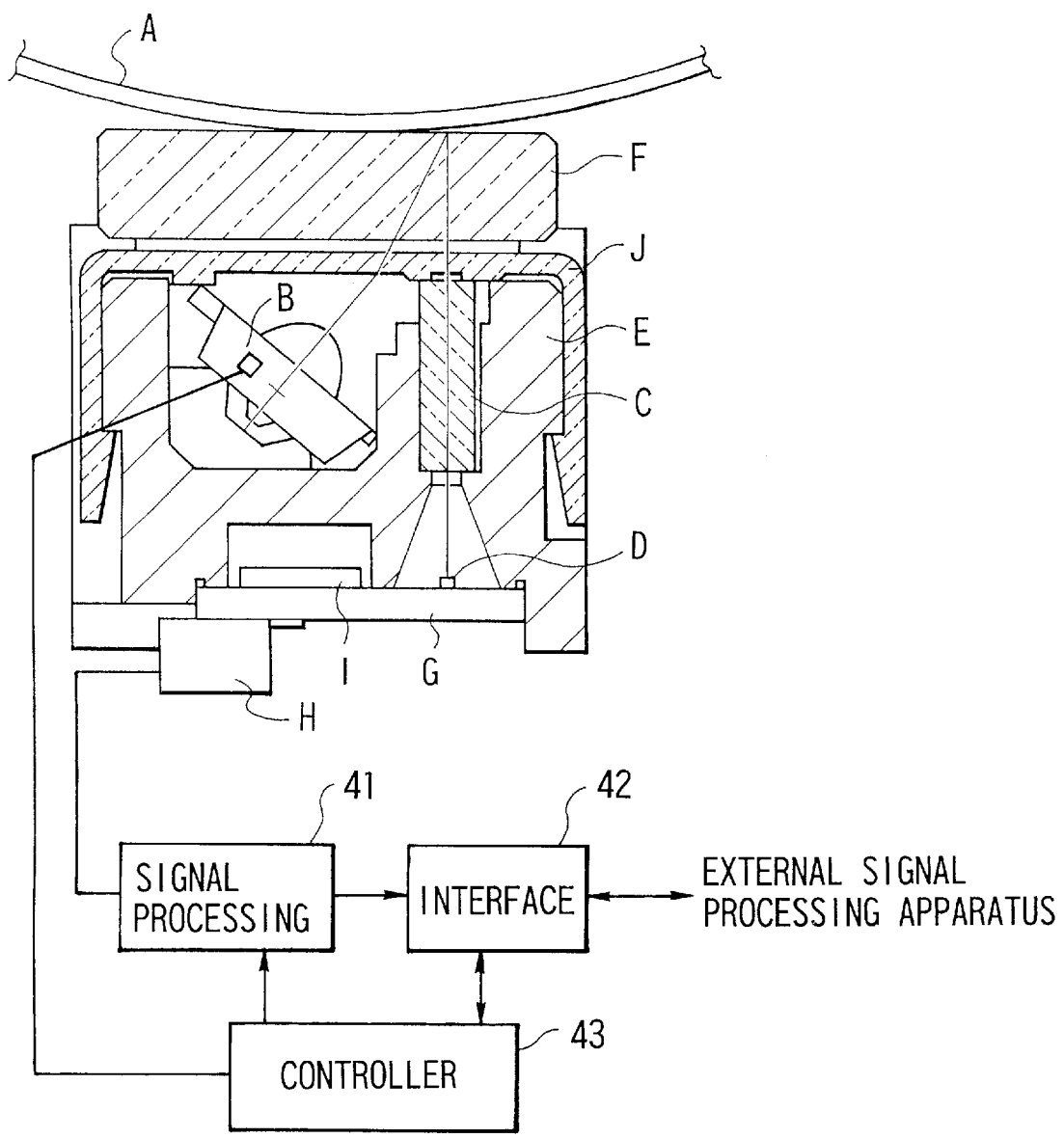
FIG. 1(b) is a circuit diagram showing a scanner having the image reading apparatus according to the first embodiment.
Figure 2:
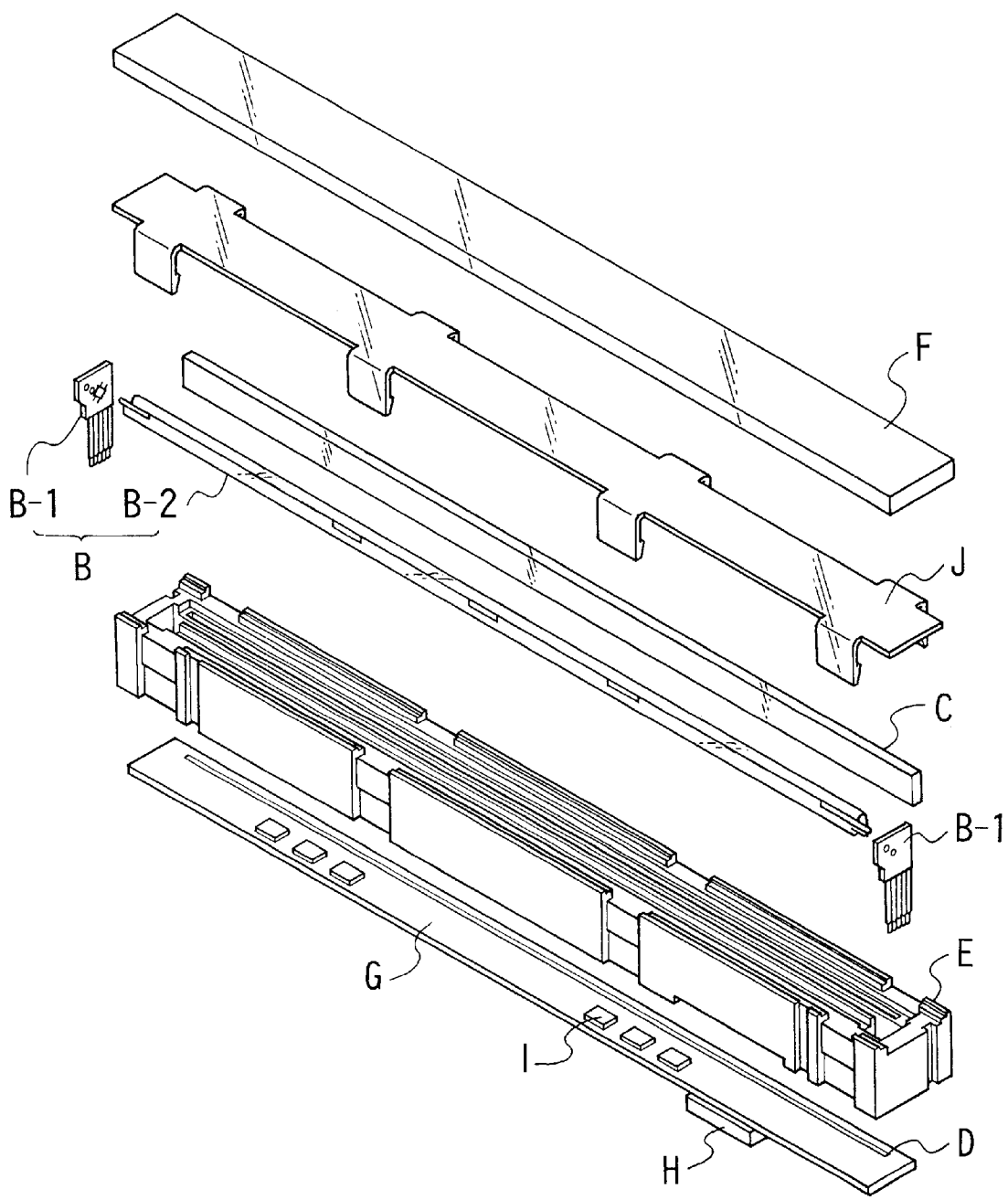
FIG. 2 is a perspective view illustrating the structure of the image reading apparatus according to the first embodiment.

FIG. 1(a) is a cross-sectional view of an image reading apparatus according to a first embodiment of the present invention. FIG. 1(b) is a circuit diagram showing a scanner having the image reading apparatus according to the first embodiment. FIG. 2 is a perspective view illustrating the structure of the image reading apparatus according to the first embodiment.

In FIG. 1(a), reference character A denotes an original document which has an image to be read on the surface thereof. In FIGS. 1(a) and 2, reference character B denotes a light source for casting light upon the original document A. Reference character C denotes a rod lens array for imaging the light flux reflected from the surface of the original document A onto the surface of a sensor D. The sensor D is composed of a linear array of photoelectric converting elements such as CCD or the like. Reference character E denotes a housing for holding the light source B, the rod lens array C, and the sensor D. Reference character F denotes a glass plate which holds the original document A. Reference character J denotes a cover glass for fixing the light source B and the rod lens array C to the housing E. Reference character G denotes a substrate, reference character I denotes a peripheral circuit for signal processing of the image signals from the sensor D mounted on the substrate G, and reference character H denotes a connector for outputting the processed image signals from the peripheral circuit I, and is fixed to the housing E.

The light source B is constructed by combining an LED lamp mounted on an appropriate circuit board as shown in B-1 in FIG. 2, and an optical member formed on light-transmissive material as shown in B-2.

Referring to FIG. 1(b) which is a circuit diagram showing a scanner in which the image reading apparatus according to the first embodiment is incorporated, a signal processing circuit 41, which includes an A/D converter, is arranged to process image signals outputted from the connector D of the image reading apparatus. An interface circuit 42 is arranged to perform bilateral communications with an external signal processing apparatus, such as a personal computer, i.e., to receive commands from the external signal processing apparatus and send the image signals processed by the signal processing circuit 41 to the external signal processing apparatus. A controller 43, such as a CPU (central processing unit), is arranged to synchronously control the signal processing circuit 41, the interface circuit 42 and the light source B.

Figure 3:
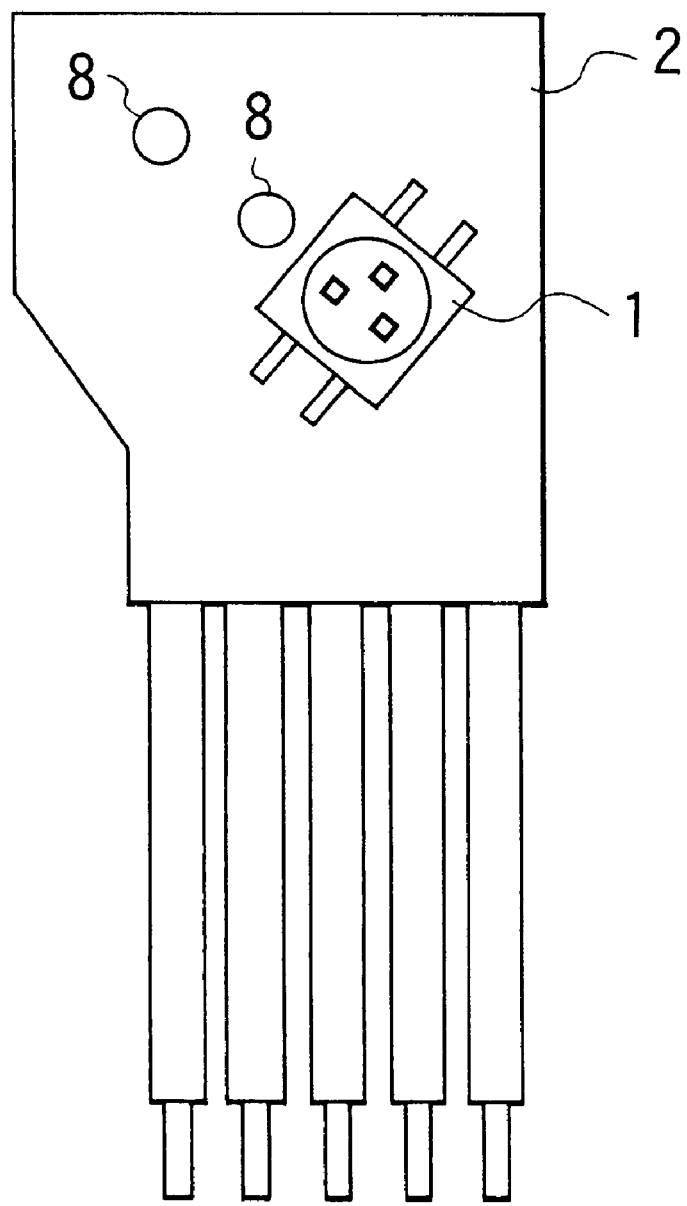
FIG. 3 is a diagram illustrating in detail an LED lamp in the image reading apparatus according to the first embodiment, and a printed circuit board holding the same.

Next, the details of the light source B shown in FIG. 1(a) and FIG. 2 will be described. FIG. 3 is a diagram illustrating in detail an LED lamp and a printed circuit board holding it. Reference numeral 1 denotes an LED lamp fabricated by mounting three types of LED chips, exhibiting light of red, blue, and green, mounted within the same package, this package being formed of resin, ceramics, or the like. Reference numeral 2 denotes a printed circuit board. The LED lamp 1 is mounted on the printed circuit board 2 by means of reflow soldering or some other like method. The printed circuit board 2 is provided with caulking holes 8 for attachment to the optical member shown in FIGS. 4(a) to 4(h), by caulking.

FIGS. 4(a) to 4(h) are diagrams illustrating in detail the optical member. The overall optical member is formed of a single light-transmissive member 3 formed of a light-transmissive material such as acrylic resin or the like. In FIGS. 4(a) to 4(h), reference numeral 4 denotes an entrance surface by which the light flux emitted by the LED lamp 1 enters the light-transmissive member 3, and reference numeral 5 denotes an area for reflecting and/or scattering the light flux propagated through the light-transmissive member 3 to project the light flux from the light-transmissive member 3. The arrow n indicates the normal line of the area 5.

In the first embodiment, the area 5 is formed by making the corresponding surface of the light-transmissive member 3 into a fine saw-tooth form. In the case of the first embodiment, the saw-tooth form is an isosceles triangle with an apex angle of 106°, with the angle of the two adjacent sides symmetrical, but need not be restricted to an isosceles triangle. A general triangle in which the angle of the two adjacent sides is not symmetrical may be used instead. Further, the saw-tooth form need not be restricted to a triangle, and rather other forms such as a trapezoid or the like may be used, so long as the form has an inclined side which reflects the light flux in the other direction. Further, there is no need that this form or the angle of the inclined side be constant over the entire range. That is, the quantity of light of the light flux of the LED lamp 1 entering from both ends of the light-transmissive member 3 is not the same at the portion of entering the light-transmissive member 3 and the center portion thereof, and it is better to make the amount of light cast from each portion uniform.

A paint formed by dispersing metal powder such as aluminum or fine metal flakes thereof into a solvent is coated to the surface of the saw-tooth portion of the area 5, which when dried, forms a film with strong reflecting properties. Of course, if increasing costs by a certain degree is not a matter of consideration, a reflecting film cam be formed by a vacuum process such as standard vacuum vapor deposition. Also, linear illumination can also be obtained by employing a film of dispersion reflecting, although the obtained illuminance is low. Otherwise, a structure may be employed wherein such a film is not formed at all, and the total reflection of the saw-tooth area alone is employed.

The surface facing the area 5 is an exit surface, to which the light condensing part 7 is formed as a cylindrical lens.

Provided to ten portions of the side surface of the light-transmissive member 3 are holding portions for holding the light-transmissive member 3. Also, provided to two of the ten holding portions are gate portions for injecting resin for forming the light-transmissive member 3. Provided at the ends of the light-transmissive member 3 are caulking pins 9 for fitting the caulking holes provided in the printed circuit board 2 for holding the LED lamp 1. As can be understood by comparing the LED lamp 1 in FIG. 3 and the printed circuit board 2 holding the LED lamp 1, fitting the caulking pin 9 of the light-transmissive member 3 and the caulking hole 8 of the printed circuit board 2 allows the LED lamp 1 to be attached to a position deviating from the normal line of the area 5 to which the light-transmissive member 3 is provided.

The light flux emitted from the LED lamp 1 and entering the light-transmissive member 3 from the entrance surface 4 of the light-transmissive member 3 is propagated throughout the light-transmissive member 3 by repeated total reflection off of the inner surface thereof. In the course of such reflecting, the light flux is cast into the reflecting and/or scattering area 5. The area 5 is different from the other planes of the light-transmissive member 3, and is formed in a fine saw-tooth form. The light flux cast into there is reflected while greatly changing the angle toward the exit surface. The light flux which has reached the exit surface has been greatly changed in angle at the area 5, so that the conditions of total reflection are no longer met, and the light flux is cast out of the light-transmissive member 3. At this time, the light is linearly converged on the plane to be illuminated by means of the effects of the light condensing part 7 formed as a cylindrical lens. The light condensing part 7 need not be restricted to a known form with a round cross-section, but is preferably selected as a freer form such as th at expressed by a general polynomial, for example, in the case of attempting to obtain illumination on the plane to be illuminated with maximal uniformity and illuminance. In the first embodiment, the surface thereof has a form expressed by a polynomial including terms up to the fourth degree as shown in FIG. 4(e), according to a coordinates display with the apex thereof as the origin. Further, the form is such that, in the polynomial, the sign of a coefficient of the quadratic (second-degree) term and that of a coefficient of the quartic (fourth-degree) term are opposite to the sign of a coefficient of the cubic (third-degree) term. This is in order to converge a light flux on the plane to be illuminated with maximal efficiency.

Figure 5:
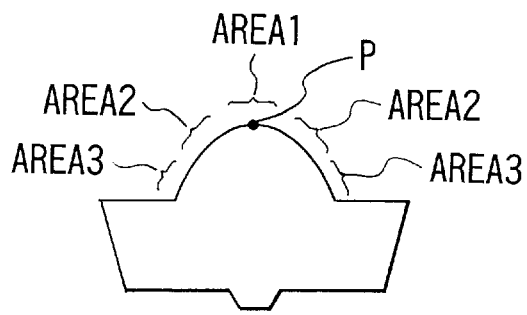
FIG. 5 is a diagram illustrating the apex, sides, and base of the cross-sectional form of the optical member of the image reading apparatus according to the first embodiment.
Figure 6:
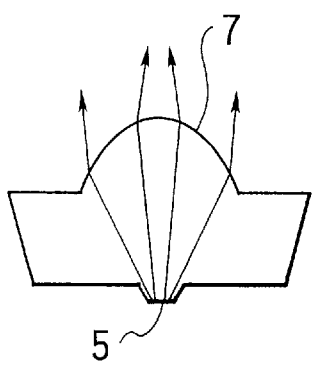
FIG. 6 is a diagram illustrating the light flux in a known example as compared with the image reading apparatus according to the first embodiment.
Figure 7:
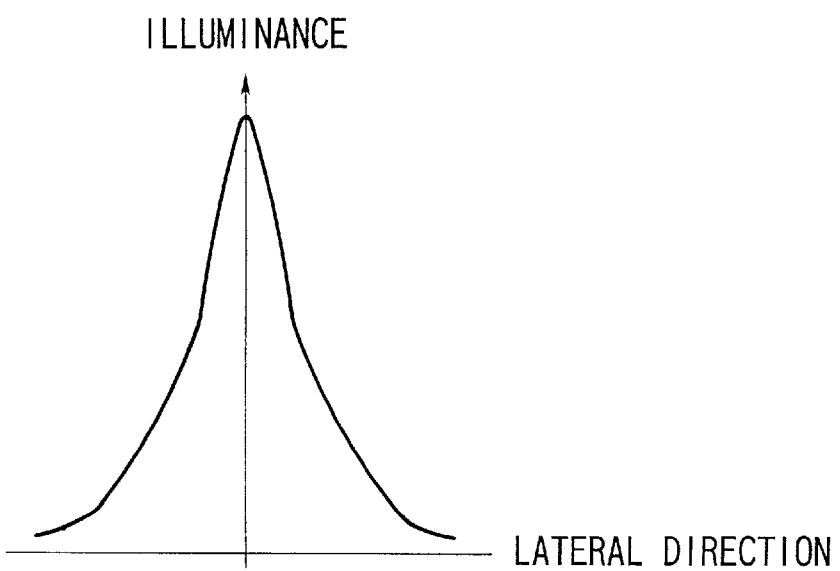
FIG. 7 is a diagram illustrating the illuminance distribution in the lateral direction on the plane to be illuminated in a known example as compared with the image reading apparatus according to the first embodiment.
Figure 8:
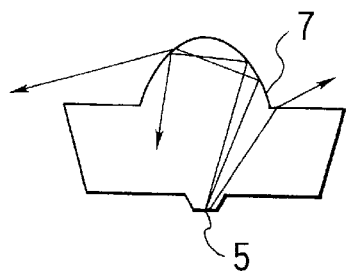
FIG. 8 is a diagram illustrating the light flux in another known example as compared with the image reading apparatus according to the first embodiment.

With a form which only has terms up to the second degree, the light flux passing near the apex P of the light condensing part 7 (shown as AREA1 in FIG. 5) is converged fairly well, but the light passing through the sides (shown as AREA2 in FIG. 5) or the base (shown as AREA3 in FIG. 5) is not sufficiently converged, so that sufficiently high illuminance cannot be obtained on the plane to be illuminated (FIG. 6). Also, the illumination distribution in the lateral direction on the plane to be illuminated has a peaked form with a sharp illuminance peak, which requires high precision in positioning and is extremely difficult to use (FIG. 7). Generally, in the event that the cross-sectional form of the light condensing part 7 is expressed by a polynomial having terms of higher degree, namely, the third degree or higher, with the apex thereof as the original point, it is thought that the curvature and inclination near the apex mainly depend on the quadratic term, and the farther away from the apex, i.e., near the sides and the base, the curvature and inclination depend on the terms of higher degree, i.e., the cubic term, the quartic term, and so forth. Accordingly, in order to obtain sufficient convergence of light passing through the sides and base of the light condensing part 7, the form thereof can be made into a form of a polynomial having terms of higher degree, i.e., the cubic term, the quartic term, and so forth. However, in the event that the sign of a coefficient of the cubic term and that of a coefficient of the quartic term are the same as the sign of a coefficient of the quadratic term, the inclination of the sides of the light condensing part 7 becomes too steep, so that the light flux reflected from the area 5 undergoes total reflection within the inclined sides when reaching the light condensing part 7, with the result that the light flux either is not emitted, or exits in an undesirable direction (FIG. 8).

Figure 9:
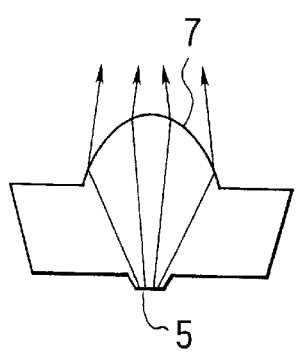
FIG. 9 is a diagram illustrating the light flux in the image reading apparatus according to the first embodiment.
Figure 10:
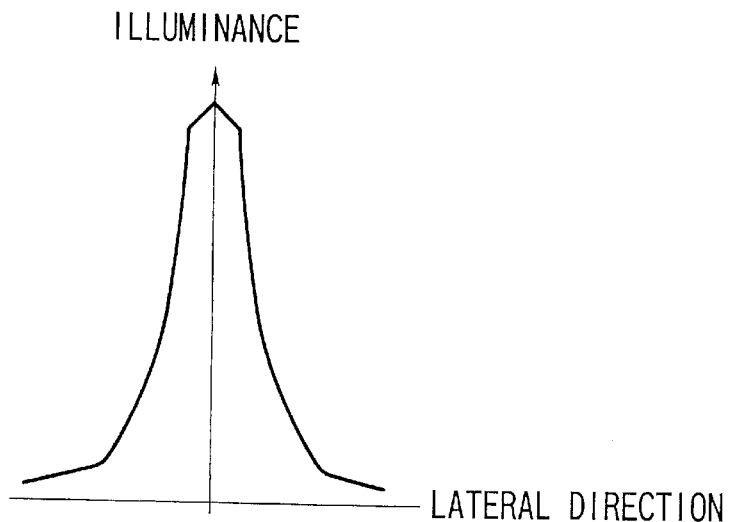
FIG. 10 is a diagram illustrating the illuminance distribution in the lateral direction on the plane to be illuminated in the image reading apparatus according to the first embodiment.

Therefore, according to the first embodiment, the sign of a coefficient of the cubic term is set to be opposite to the sign of a coefficient of the quadratic term, so that the inclination at the side portions is not too steep while maintaining the curvature near the apex. Also, the sign of a coefficient of the quartic term is set to be the same as the sign of a coefficient of the quadratic term, so as to make a steep inclination to a certain degree so that the light passing through the base portion can be sufficiently converged. Thus, the illumination distribution in the lateral direction on the plane to be illuminated exhibits a trapezoid shape, which is easy to use (FIGS. 9 and 10).

Figure 11:
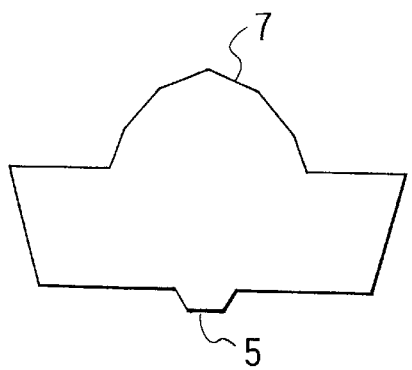
FIG. 11 is a diagram illustrating the image reading apparatus according to the first embodiment wherein the cross-sectional form of the light condensing part exhibits a polygonal line.

Although the light condensing part 7 described in the first embodiment has a continuous curved surface, but the same effects can be obtained from an interrupted polygonal section form such as that shown in FIG. 11, so long as the lines approximately follow the curve expressed by the aforementioned polynomial.

[Second Embodiment]

FIGS. 12(a) to 12(i) are diagrams illustrating an optical member of the light source, which is indicated by B-2 in FIG. 2, according to a second embodiment of the present invention. In the second embodiment, the LED lamp is fabricated by mounting three types of LED chips, exhibiting light of red, blue, and green, mounted within the same package, this package being formed of resin, ceramics, or the like, and this LED lamp is provided near only one end of the light-transmissive member 3. Further, a reflecting surface is provided at the other end portion 6 of the light-transmissive member 3. This reflecting surface may be fabricated by applying paint with light dispersing properties directly onto the end portion 6 of the light-transmissive member 3 by means of vapor deposition or the like of metal such as aluminum or the like, or may be provided as a separate member. Otherwise, in the event that practically all of the light flux entering from the entrance surface 4 is made incident on the reflecting and/or scattering area 5 and exits from the exit surface, such a reflecting surface need not be provided. Further, in the event that there is plenty of light, and the light can be allowed to exit from the end portion, such a reflecting surface need not be provided, too. In such a case, a portion of the light flux undergoes Fresnel reflection or total reflection at the inner surface of the end portion 6, so that some effects of a reflecting surface can be expected. Further, by means of forming the end portion 6 as a corner cube, total reflection tends to occur easily, and effects which are approximately the same as the provision of a reflecting surface can be obtained. Thus, providing the LED lamp 1 near only one end of the light-transmissive member 3 allows costs to be reduced due to the reduced number of LED chips.

[Third Embodiment]

Figure 14:
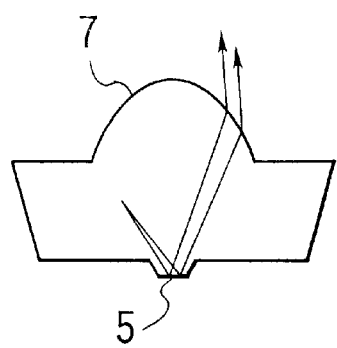
FIG. 14 is a diagram illustrating the angle distribution of the light flux reflected at the reflecting and/or scattering area and heading toward the light condensing part at a position near the LED lamp in the image reading apparatus according to the third embodiment.
Figure 15:
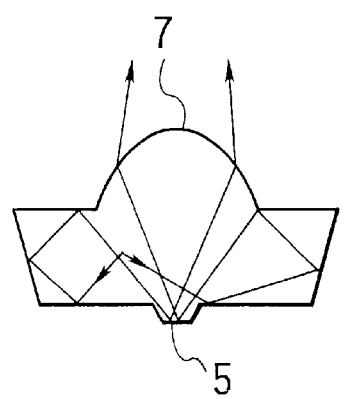
FIG. 15 is a diagram illustrating the angle distribution of the light flux reflected at the reflecting and/or scattering area and heading toward the light condensing part at a position away from the LED lamp in the image reading apparatus according to the third embodiment.
Figure 16:
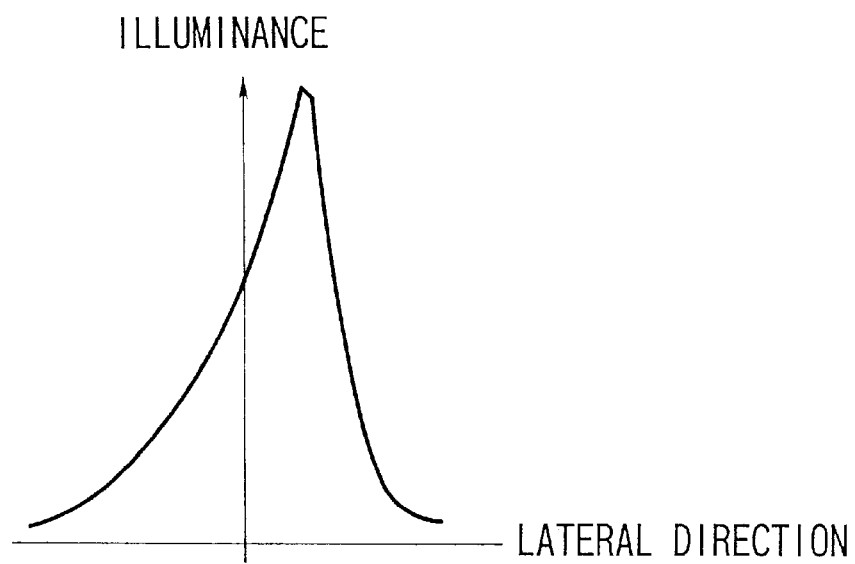
FIG. 16 is a diagram illustrating the illuminance distribution in the lateral direction on the plane to be illuminated at a position near the LED lamp in the image reading apparatus according to the third embodiment.

FIGS. 13(a) to 13(f) are diagrams illustrating an optical member of the light source, which is indicated by B-2 in FIG. 2, according to a third embodiment of the present invention. In the third embodiment, the form of the light condensing part 7 provided for the light-transmissive member 3 varies according to the position of the light-transmissive member 3 in the longitudinal direction thereof. Generally, the angle distribution of the light flux reflected from the reflecting and/or scattering area 5 and heading toward the light condensing part 7 differs between a position near the LED lamp 1 (FIG. 14) and a position at the middle part of the light-transmissive member 3 away from the LED lamp 1 (FIG. 15). Accordingly, the state of light convergence of illumination light for casting onto the original document differs between the position near the LED lamp 1 and the position away from the LED lamp 1, in the event that the form of the light condensing part 7 is the same throughout. This can cause problems such as the illumination distribution on the original document becoming non-uniform due to the illuminance near the LED lamp 1 being high owing to overly sharp convergence at that point, or problems such as the light flux cast into the area 5 being offset at an angle near the LED lamp 1, causing the light reflected there and heading toward the light condensing part 7 to also be offset at an angle, meaning that the convergence position on the original document is offset in the sideways direction (FIG. 16) near the LED lamp 1, and consequently, uniform illumination may not be possible.

Figure 17:
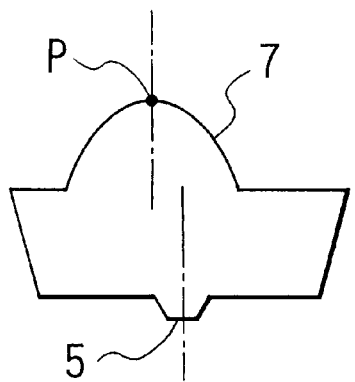
FIG. 17 is a diagram illustrating the form of the light condensing part near the LED lamp in the image reading apparatus according to the third embodiment.
Figure 18:
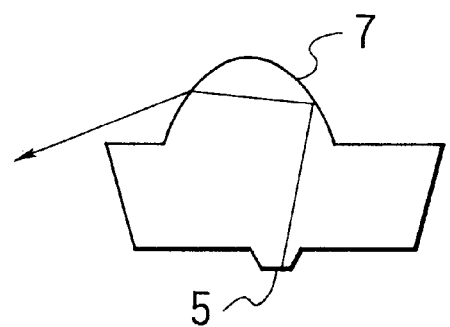
FIG. 18 is a diagram illustrating the light flux reflected at the reflecting and/or scattering area and heading toward the light condensing part at a position near the LED lamp in the image reading apparatus according to the third embodiment.
Figure 19:
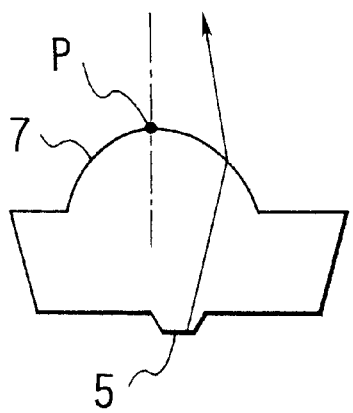
FIG. 19 is a diagram illustrating the form of the light condensing part near the LED lamp in the image reading apparatus according to the third embodiment.

In the third embodiment shown in FIGS. 13(*a*) to 13(*f*), the apex of the light condensing part 7 is formed so as to be positioned not directly above the area 5 near the LED lamps 1, but in a manner somewhat shifted sideways (FIG. 17). In the event that the arrangement is shifted in such a manner, there may be cases wherein the light flux from the area 5 undergoes total reflection at the inner side of the base portions or side portions of the light condensing part 7 (FIG. 18). In such cases, the form causing the internal reflection can be changed so that the form of the light condensing part 7 is not symmetrical, thus solving the problem (FIG. 19). Of course, the light condensing part 7 can be made to be non-symmetrical in the portions other than near the LED lamp 1, in order to obtain the necessary convergence. Particularly, this is effective in cases where the light convergence position on the original document is to be a position shifted in one direction or another, rather than directly above the area 5, or in cases where the plane to be illuminated should be illuminated from an oblique direction rather than a vertical direction.

There also may be cases where the difference in the light convergence state between the portion near the LED lamp 1 and the portion away from the LED lamp 1 shows up in the difference of the sharpness of the convergence peak. In such cases, the position of the light condensing part 7 is not changed, and, rather, it is effective to change the lens power of the light condensing part 7 between the portion near the LED lamp 1 and the portion away from the LED lamp 1.

[Fourth Embodiment]

Figure 21:
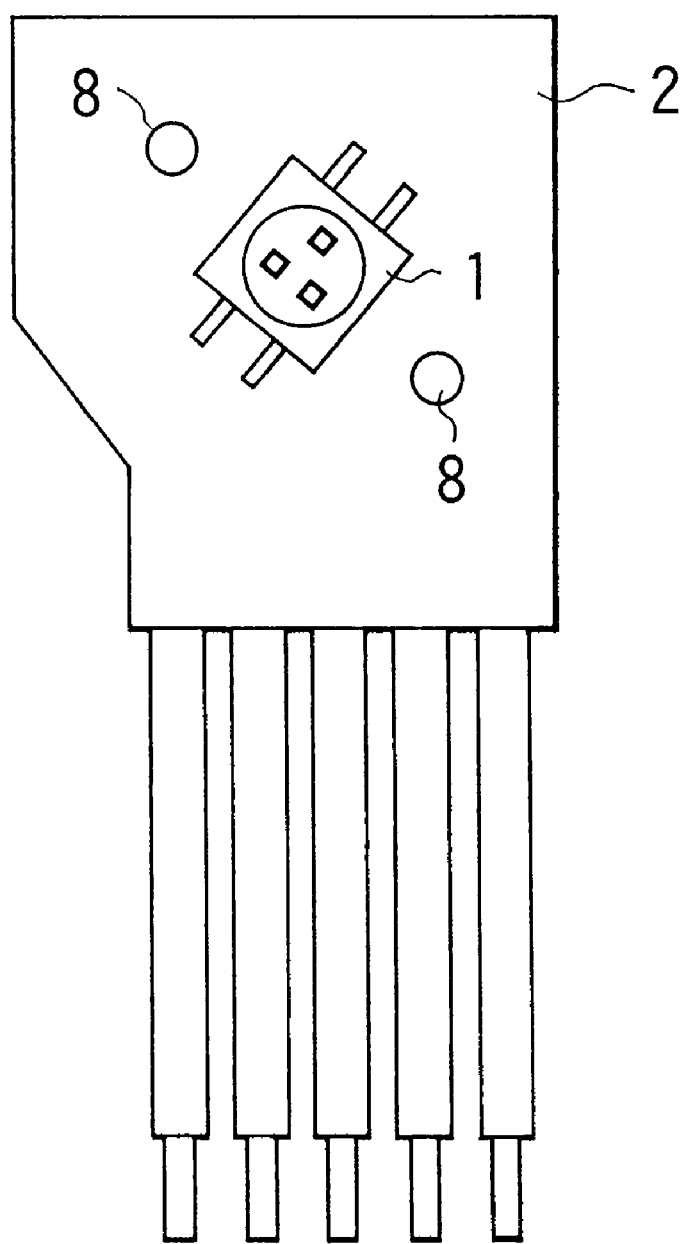
FIG. 21 is a diagram illustrating in detail an LED lamp in the image reading apparatus according to the fourth embodiment, and a printed circuit board holding the same.
Figure 28:
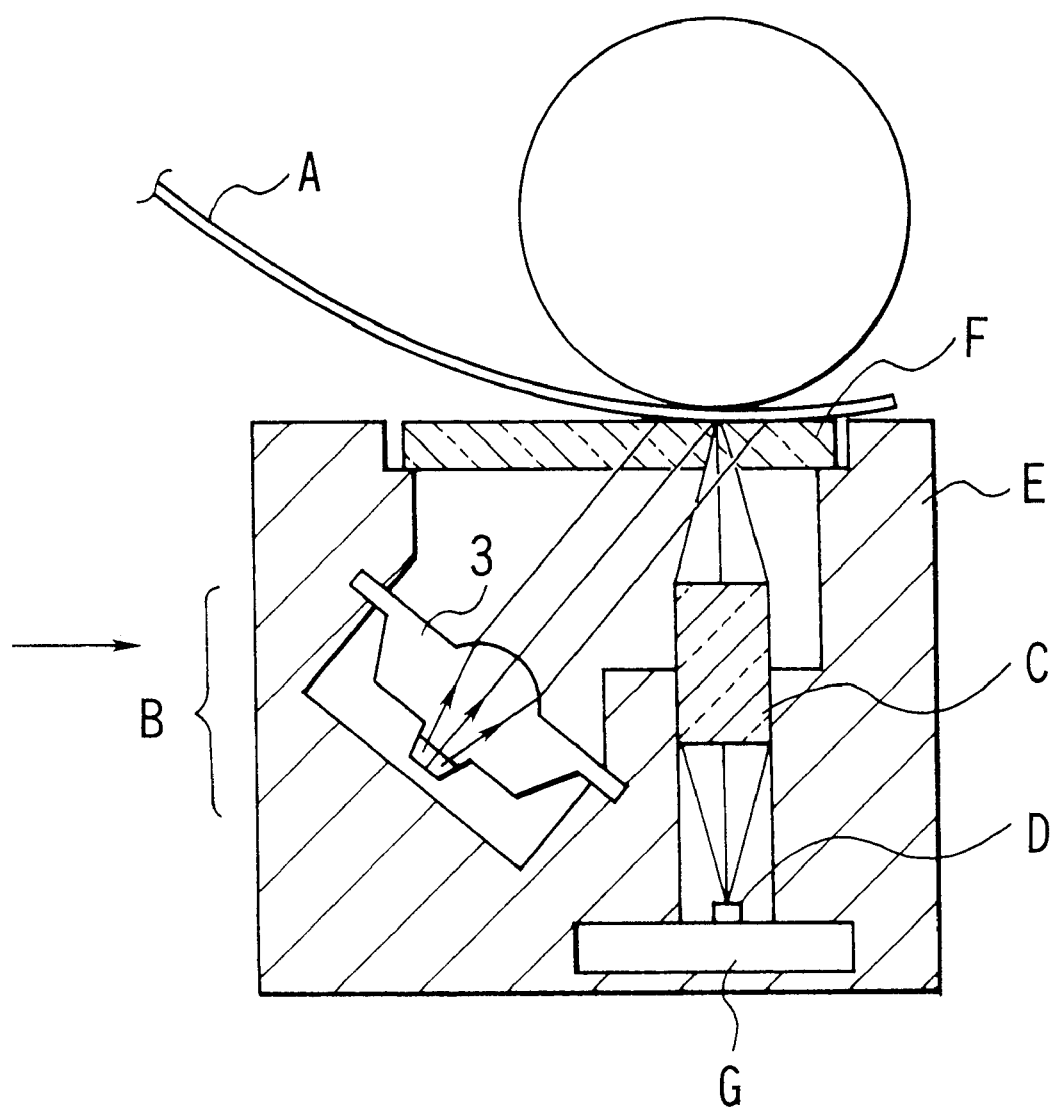
FIG. 28 is a cross-sectional diagram of a known image reading apparatus.
Figure 29A:
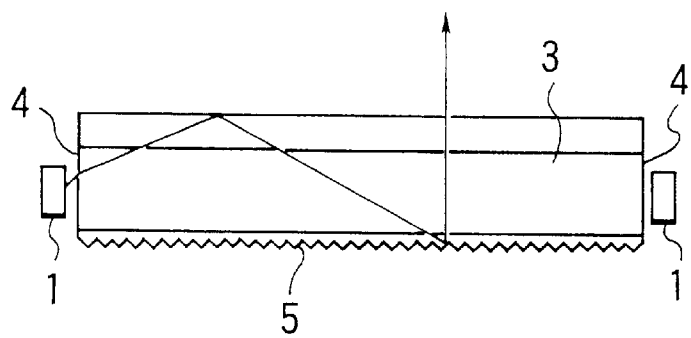
FIGS. 29(a) and 29(b) are diagrams illustrating an optical member of the known image reading apparatus.
Figure 29B:
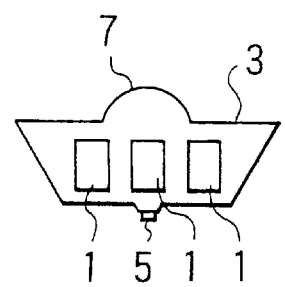
Figure 30:
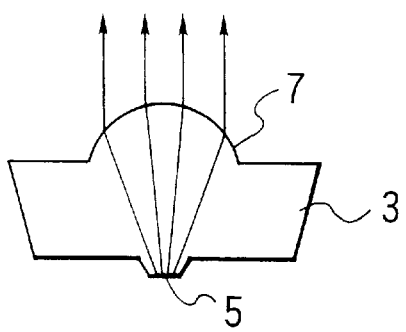
FIG. 30 is a diagram illustrating the light flux reflected at the reflecting and/or scattering area and heading toward the light condensing part in a known image reading apparatus.
Figure 31:
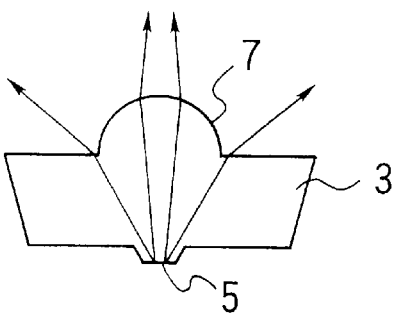
FIG. 31 is another diagram illustrating the light flux reflected at the reflecting and/or scattering area and heading toward the light condensing part in a known image reading apparatus.

FIGS. 20(*a*) to 20(*f*) and FIG. 21 are diagrams illustrating an optical member of the light source, which is indicated by B-2 in FIG. 2, according to a fourth embodiment of the present invention. The LED lamp 1 and the printed circuit board 2 shown in FIG. 21 are combined with the light-transmissive member 3 shown in FIGS. 20(*a*) to 20(*f*). In the fourth embodiment, the LED lamp 1 is mounted at a position which does not deviate by much from the normal line of the reflecting and/or scattering area 5 provided in the light-transmissive member 3, so that there is not much difference in the convergence position on the plane to be illuminated between the portion near the LED lamp 1 and the portion away from the LED lamp 1. However, the state of convergence is still not the same, so that this may show up as difference in the sharpness of the peak or amount of light flux cast into the area 5. In the fourth embodiment, countermeasures are taken against such a difference, in which the greatness of a coefficient of the quadratic term or a coefficient of the cubic term in the polynomial expressing the cross-section state of the light condensing part 7 is smaller at a position near the LED lamp 1 than at a position away from the LED lamp 1. Accordingly, in the position near the LED lamp 1, the lens power of the light condensing part 7 is weak, thereby correcting the difference in angle distribution of the light flux reflected at the reflecting and/or scattering area 5 and heading toward the light condensing part 7 between the position near the LED lamp 1 and the position away from the LED lamp 1, and creating an overall uniform state of light convergence. The same effect can also be obtained by strengthening the lens power of the light condensing part 7 at the position near the LED lamp 1 as much as possible for temporary convergence, and using the light flux which begins dispersion again for illuminating the surface of the original document. Also, changing the form of the light condensing part 7 between the portion near the LED lamp 1 and the portion away from the LED render uniform the illuminance on the surface of the original document is also effective for correction in the case where more light enters the area 5 at the position near the LED lamp 1 and the light flux hardly reaches the area 5 at the position away from the LED lamp 1 so that the non-uniformity of illuminance occurs. The details of the LED lamp 1 and the printed circuit board 2 holding the LED lamp 1 in the fourth embodiment are shown in FIG. 21. As can be seen from FIG. 21, the position of caulking has been changed.

The effect of the above-described arrangement, i.e., changing the form of the light condensing part 7 according to the position in the longitudinal direction thereof, or forming the light condensing part 7 so as not to be symmetrical, is also effective in cases where the form of the light condensing part 7 is of a round cross-section, or in cases of a more generally used polynomial, regardless of whether the signs of a coefficient of the quadratic term and a coefficient of the cubic term are either the same or different.

[Fifth, Sixth, and Seventh Embodiments]

FIGS. 22(*a*) to 22(*i*) show a fifth embodiment of the present invention which is based on the example of the light source shown in FIGS. 12(*a*) to 12(*i*) in which the LED chip 1 is provided near only one end of the light-transmissive member 3, and further wherein arrangements are added such as changing the form of the light condensing part 7 according to the position in the longitudinal direction thereof, or forming the light condensing part 7 so as not to be symmetrical.

FIGS. 23(*a*) to 23(*g*) show a sixth embodiment of the present invention which is based on the example of the light source shown in FIGS. 12(*a*) to 12(*i*), and wherein a holding portion 10 (shown in FIG. 4(*a*)) for positioning and holding the light-transmissive member 3 is not provided. Even without providing the holding portion 10, several protrusions equivalent to the holding portion 10 may be provided on the side of the housing (shown as E in FIGS. 1(*a*) and 2), for holding the light-transmissive member 3. Also, neither holding portions nor protrusions need to be provided to neither the side of the light-transmissive member 3 nor that of the housing, so long as the area of a portion of contact between the light-transmissive member 3 and the housing E is not too great, or so long as there is no close contact in the portion of contact such that the light flux undergoing propagation by total reflection within the light-transmissive member 3 leaks out.

Further, the difference in form between the portion near the LED lamp 1 and the portion away from the LED lamp 1 does not only deal with the light condensing part 7, but also deals with changing the position or width of the reflecting and/or scattering area 5 or other portions as well, thereby exhibiting similar effects.

In the example of the light source shown in FIGS. 23(a) to 23(g), the inclination of the side portion is changed according to the position in the longitudinal direction, in addition to that of the light condensing part 7. The resultant effects of such an arrangement are that the light flux propagated through the inside of the light-transmissive member 3 at the portion away from the LED lamp 1 can be cast into the area 5 and cast out of the exit surface in a more efficient manner.

Also, in a seventh embodiment of the present invention shown in FIGS. 24(a) to 24(g), the height or width of the area 5 is changed according to the position in the longitudinal direction thereof. This arrangement also is effective in the light flux propagated through the inside of the light-transmissive member 3 at the portion away from the LED lamp 1 being cast into the area 5 and cast out of the exit surface in a more efficient manner.

[Eighth, Ninth, and Tenth Embodiments]

FIGS. 25(a) to 25(i), FIGS. 26(a) to 26 (g), and FIGS. 27(a) to 27(g) show eighth, ninth, and tenth embodiments of the present invention, respectively, wherein the cross-section of the light condensing part 7 is of an approximately circular shape.

In FIGS. 25(a) to 25(i), the form of the light condensing part 7 is such that its section is expressed by a polynomial having terms of higher degree, in which the sign of a coefficient of the cubic term is selected to be different from the sign of a coefficient of the quadratic term and/or that of a coefficient of the quartic term.

In FIGS. 26(a) to 26(g), the form of the light condensing part 7 is made to be non-symmetrical.

In FIGS. 27(a) to 27(g), the form of the light condensing part 7 varies according to the position in the longitudinal direction thereof.

Effects similar to those of the earlier-described embodiments can be obtained in the examples wherein the cross-section is approximately circular, as well.

As described above, according to the present invention, problems of image reading apparatuses such as the illuminance of the original document reading portion being too low, or the illuminance distribution on the original document becoming non-uniform, can be solved by using a freer form such as expressed by a general polynomial for the form of the light condensing part, rather than a round cross-sectional form. Also, further effects can be obtained by making the light condensing part in such a form that the sign of a coefficient of the quadratic term and/or that of a coefficient of the quartic term is opposite to the sign of a coefficient of the cubic term. Also, according to the present invention, a uniform illumination distribution can be obtained by changing the form of the light condensing part according to the position in the longitudinal direction of the light-transmissive member.

Also, according to the present invention, even higher illuminance and even more uniform illumination distribution can be obtained even in cases where the position of light convergence on the surface of the original document is shifted to the right or left instead of directly above the reflecting and/or scattering area provided for reflecting and/or scattering the light flux propagated inside the light-transmissive member to project the light flux from the light-transmissive member, or where the plane to be illuminated is illuminated from an oblique direction instead of a vertical direction, by means of forming the light condensing part so as to be non-symmetrical.

What is claimed is:

1. An illumination device comprising:

a light guide element having an entrance surface provided at one end thereof for an incident light flux, an exit surface provided on a side other than the one end extending in a longitudinal direction of said light guide element for allowing the incident light flux to exit therefrom, a reflecting and/or scattering area provided at a side other than said exit surface for reflecting and/or scattering the light flux propagated in a light-transmissive member, and a light condensing part provided on said exit surface for condensing the exiting light flux; and a light source provided adjacent to said entrance surface of said light guide element, wherein, assuming that in a cross-section orthogonally intersecting said longitudinal direction, a direction opposite to a normal line of said reflecting and/or scattering area is a z axis and a direction orthogonally intersecting the z axis is a y axis, at least a part of a surface of said light condensing part is expressed by a polynomial of y, and at least one of coefficients of odd-number-th degree terms in the polynomial is not "0".

2. An illumination device according to claim 1, wherein in the polynomial of y expressing at least a part of the surface of said light condensing part, the sign of a coefficient of the quadratic term is different from the sign of a coefficient of the cubic term.

3. An illumination device according to claim 1, wherein in the polynomial of y expressing at least a part of the surface of said light condensing part, the sign of a coefficient of the quartic term is different from the sign of a coefficient of the cubic term.

4. An illumination device according to claim 1, wherein in the polynomial of y expressing at least a part of the surface of said light condensing part, one or all of coefficients of various degree terms and a constant term change following a direction perpendicular to said cross-section.

5. An illumination device comprising: a longitudinal light guide made of light-transmissive member, having a light incident surface provided at one end thereof, a longitudinal light emitting surface provided on a side other than the one end extending in a longitudinal direction of said longitudinal light guide for emitting the light, a longitudinal reflecting and/or scattering area provided at a side other than said light emitting surface for reflecting and/or scattering the light transmitted in said longitudinal light guide along said longitudinal direction, and a longitudinal lens part provided on said light emitting surface for condensing the emitting light linearly; and a light source provided adjacent to said light incident surface of said longitudinal light guide, wherein at least a part of a cross-section form of said longitudinal lens part changes following said longitudinal direction.

6. A device according to claim 5, wherein at least a part of a form of said longitudinal reflecting and/or scattering area changes following said longitudinal direction.

7. An illumination device comprising: a longitudinal light guide made of a light-transmissive member, having a light incident surface provided at one end thereof, a longitudinal light emitting surface provided on a side other than the one end extending in a longitudinal direction of said longitudinal light guide for emitting the light, a longitudinal reflecting and/or scattering area provided at a side other than said light emitting surface for reflecting and/or scattering the light transmitted in said longitudinal light guide along said longitudinal direction, and a longitudinal lens part provided on said light emitting surface for condensing the emitting light linearly and a light source provided adjacent to said light incident surface of said longitudinal light guide, wherein in a cross-section orthogonally intersecting said longitudinal direction, a position of an apex of said longitudinal lens part deviates from a normal line of said longitudinal reflecting and/or scattering area.

8. An illumination device comprising: a longitudinal light guide made of light-transmissive member, having a light incident surface provided at one end thereof, a longitudinal light emitting surface provided on a side other than the one end extending in a longitudinal direction of said longitudinal light guide for emitting the light, a longitudinal reflecting and/or scattering area provided at a side other than said light emitting surface for reflecting and/or scattering the light transmitted in said longitudinal light guide along said longitudinal direction, and a longitudinal lens part provided on said light emitting surface for condensing the emitting light linearly; and a light source provided adjacent to said light incident surface of said longitudinal light guide, wherein in a cross-section orthogonally intersecting said longitudinal direction, at least a part of a surface of said longitudinal lens part is not symmetrical with respect to a line passing an apex of said longitudinal lens part.

9. An image reading apparatus having an illumination device, said illumination device comprising:
   a light guide element having an entrance surface provided at one end thereof for an incident light flux, an exit surface provided on a side other than the one end extending in a longitudinal direction of said light guide element for allowing the incident light flux to exit therefrom, a reflecting and/or scattering area provided at a side other than said exit surface for reflecting and/or scattering the light flux propagated in a light-transmissive member, and a light condensing part provided on said exit surface for condensing the exiting light flux; and
   a light source provided adjacent to said entrance surface of said light guide element,
   wherein, assuming that in a cross-section orthogonally intersecting said longitudinal direction, a direction opposite to a normal line of said reflecting and/or scattering area is a z axis and a direction orthogonally intersecting the z axis is a y axis, at least a part of a surface of said light condensing part is expressed by a polynomial of y, and at least one of coefficients of odd-number-th degree terms in the polynomial is not "0".

10. An image reading apparatus according to claim 9, wherein in the polynomial of y expressing at least a part of the surface of said light condensing part of said light guide element of said illumination device, the sign of a coefficient of the quadratic term is different from the sign of a coefficient of the cubic term.

11. An image reading apparatus according to claim 9, wherein in the polynomial of y expressing at least a part of the surface of said light condensing part of said light guide element of said illumination device, the sign of a coefficient of the quartic term is different from the sign of a coefficient of the cubic term.

12. An image reading apparatus according to claim 9, wherein in the polynomial of y expressing at least a part of the surface of said light condensing part of said light guide element of said illumination device, one or all of coefficients of various degree terms and a constant term change following a direction perpendicular to said cross-section.

13. An image reading apparatus having an illumination device, said illumination device comprising; a longitudinal light guide made of light-transmissive member, having a light incident surface provided at one end thereof, a longitudinal light emitting surface provided on a side other than the one end extending in a longitudinal direction of said longitudinal light guide for emitting the light, a reflecting and/or scattering area provided at a side other than said light emitting surface for reflecting and/or scattering the light transmitted in said longitudinal light guide along said longitudinal direction, and a longitudinal lens part provided on said light emitting surface for condensing the emitting light linearly; and a light source provided adjacent to said light incident surface of said longitudinal light guide, wherein at least a part of a cross-section form of said longitudinal lens part changes following said longitudinal direction.

14. An apparatus according to claim 13, wherein at least a part of a form of said longitudinal reflecting and/or scattering area changes following said longitudinal direction.

15. An image reading apparatus having an illumination device, said illumination device comprising: a longitudinal light guide made of light-transmissive member, having a light incident surface provided at one end thereof, a longitudinal light emitting surface provided on a side other than the one end extending in a longitudinal direction of said longitudinal light guide for emitting the light, a longitudinal reflecting and/or scattering area provided at a side other than said light-emitting surface for reflecting and/or scattering the light transmitted in said longitudinal light guide along said longitudinal direction, and a longitudinal lens part provided on said light emitting surface for condensing the emitting light linearly; and a light source provided adjacent to said longitudinal light incident surface of said light guide, wherein in a cross-section orthogonally intersecting said longitudinal direction, a position of an apex of said longitudinal lens part deviates from a normal line of said longitudinal reflecting and/or scattering area.

16. An image reading apparatus having an illumination device, said illumination device comprising: a longitudinal light guide made of light-transmissive member having a light incident surface provided at one end thereof, a longitudinal light emitting surface provided on a side other than the one end extending in a longitudinal direction of said longitudinal light guide for emitting the light, a longitudinal reflecting and/or scattering area provide at a side other than said light emitting surface for reflecting and/or scattering the light transmitted in said longitudinal light guide along said longitudinal direction, and a longitudinal lens part provided on said light emitting surface for condensing the emitting light linearly; and a light source provided adjacent to said light incident surface of said longitudinal light guide, wherein in a cross-section orthogonally intersecting said longitudinal direction, at least a part of a surface of said longitudinal light condensing part is not symmetrical with respect to a line passing an apex of said longitudinal lens part.

17. An image reading apparatus comprising: an illumination device including: a longitudinal light guide made of light-transmissive member, having a light incident surface provided at one end thereof, a longitudinal light emitting surface provided on a side other than the one end extending in a longitudinal direction of said longitudinal light guide for emitting the light, a longitudinal reflecting and/or scattering area provided at a side other than said light emitting surface for reflecting and/or scattering the light transmitted in said longitudinal light guide along said longitudinal direction, and a longitudinal lens part provided on said light emitting surface for condensing the emitting light linearly; and a light source provided adjacent to said light incident surface of said longitudinal light guide, wherein at least a part of a cross-section form of said longitudinal lens part changes following the longitudinal direction; an image sensor for reading an image of an original illuminated by said illumination device; a signal processing circuit for processing an image signal read out from said image sensor; an interface circuit for bilateral communication with an external signal processing apparatus; and a controller for synchronously controlling said light source, said signal processing circuit and said interface circuit.

18. An image reading apparatus according to claim 17, wherein said signal processing circuit includes an A/D converter.

19. An image reading apparatus according to claim 17, wherein said controller includes a central processing unit.

20. An apparatus according to claim 17, wherein at least a part of a form of said longitudinal reflecting and/or scattering area changes following said longitudinal direction.

21. An illumination device comprising:

a light guide made of a light-transmissive member, having a light incident surface provided at one end thereof, a light emitting surface provided on a side other than the one end extending in a longitudinal direction of said light guide for emitting the light, a reflecting and/or scattering area provided at a side other than said light emitting surface for reflecting and/or scattering the light transmitted in said light guide, and a light condensing part provided on said light emitting surface for condensing the emitting light; and a light source provided adjacent to said light incident surface of said light guide, wherein, assuming that in a cross-section orthogonally intersecting said longitudinal direction, a direction opposite to a normal line of said reflecting and/or scattering area is a z axis and a direction orthogonally intersecting the z axis is a y axis, at least a part of a surface of said light condensing part is expressed by a polynomial of y, and at least one of coefficients of odd-number-th degree terms in the polynomial is not "0".

22. An image reading apparatus having an illumination device, said illumination device comprising:

a light guide made of light-transmissive member, having a light incident surface provided at one end thereof, a light emitting surface provided on a side other than the one end extending in a longitudinal direction of said light guide for emitting the light, a reflecting and/or scattering area provided at a side other than said light emitting surface for reflecting and/or scattering the light transmitted in said light guide, and a light condensing part provided on said light emitting surface for condensing the emitting light; and a light source provided adjacent to said light incident surface of said light guide, wherein, assuming that in a cross-section orthogonally intersecting said longitudinal direction, a direction opposite to a normal line of said reflecting and/or scattering area is a z axis and a direction orthogonally intersecting the z axis is a y axis, at least a part of a surface of said light condensing part is expressed by a polynomial of y, and at least one of coefficients of odd-number-th degree terms in the polynomial is not "0".

* * * * *

UNITED STATES PATENT AND TRADEMARK OFFICE
CERTIFICATE OF CORRECTION

PATENT NO. : 6,360,030 B1
DATED : March 19, 2002
INVENTOR(S) : Tatsundo Kawai et al.

It is certified that error appears in the above-identified patent and that said Letters Patent is hereby corrected as shown below:

Column 2,
Line 45, delete "at to the" and insert -- at the --.

Column 7,
Line 35, delete "th at" and insert -- that --.

Column 10,
Line 23, delete "LED render" and insert -- LED lamp 1 to render --.

Column 11,
Line 27, delete "25i)" and insert -- 25(i) --.

Signed and Sealed this

Twenty-second Day of October, 2002

Attest:

JAMES E. ROGAN
Attesting Officer
Director of the United States Patent and Trademark Office